United States Patent [19]

Lanning et al.

[11] 4,008,470
[45] Feb. 15, 1977

[54] PASSIVE RANGING SYSTEM

[75] Inventors: George R. Lanning, Corona; John Y. K. Chang, Riverside, both of Calif.

[73] Assignee: The United States of America as represented by the Secretary of the Navy, Washington, D.C.

[22] Filed: Feb. 27, 1968

[21] Appl. No.: 710,703

[52] U.S. Cl. ................................. 343/6 A; 343/15
[51] Int. Cl.² ......................................... G01S 9/04
[58] Field of Search ............... 343/6, 12, 6 R, 6 A, 343/15

[56] References Cited
UNITED STATES PATENTS

| | | | |
|---|---|---|---|
| 2,552,172 | 5/1951 | Hawes | 343/6 A |
| 2,972,141 | 2/1961 | Barlow et al. | 343/6 A X |
| 3,153,232 | 10/1964 | Fletcher et al. | 343/6 |
| 3,212,091 | 10/1965 | Bissett et al. | 343/6 X |
| 3,264,641 | 8/1966 | Palmer | 343/15 X |

*Primary Examiner*—Malcolm F. Hubler
*Attorney, Agent, or Firm*—Richard S. Sciascia; Joseph M. St.Amand; T. M. Phillips

[57] ABSTRACT

A passive ranging system for determining the range of a target radar by utilizing the scan characteristics of the target radar. Receivers are placed on each of two aircraft flying in a specified formation. One aircraft relays detected pulse amplitude envelopes to the other aircraft. The second aircraft measures time delay between impacts of the main beam of the target radar on the two aircraft and a computer determines range according to equation $R = D/K\Delta t$ where $\Delta t$ is the measured time difference, D is the distance between aircraft and K is a constant depending on the type of target radar.

4 Claims, 2 Drawing Figures

GEORGE R. LANNING
JOHN Y. K. CHANG
INVENTORS

BY

ATTORNEYS

PASSIVE RANGING SYSTEM

The invention herein described may be manufactured and used by or for the Government of the United States of America for governmental purposes without the payment of any royalties thereon or therefor.

BACKGROUND

The present invention relates to passive airborne ranging systems and more particularly to passive airborne ranging systems wherein time delay between impacts of a radar main beam on two separate aircraft is measured. In present day warfare where it is desired to destroy enemy radars, accuracy in pinpointing these radars is essential for a sure kill. Several approaches to passive ranging have been made in the past. The constant squint-angle, triangulation and the dip-angle methods all suffer from the difficulty of execution. The constant squint angle requires the performance of a specified maneuver before a reading is obtained. Not only is the ability of a pilot to fly the constant-squint trajectory unverified, but to do so would use up valuable reaction time and would require the aircraft to turn away from a direct approach to the target. The triangulation method is poor in terms of both reaction time and accuracy. The dip-angle method is essentially instantaneous but lacks the accuracy required against radar targets.

Summary

The present invention provides a measuring system that is accurate and simple to execute. The scan characteristics of a target radar are used by placing two aircraft, equipped with radar receivers, in a specified formation (over-under or side-by-side) in line with the direction of radar-beam scan. The two craft are connected by a data link system. Time delays between impact of the target radar beam on the two craft are used to compute range.

Many of the attendant advantages of this invention will become readily appreciated as the same becomes better understood by reference to the following detailed description when considered in connection with the accompanying drawings wherein.

Figure 1:
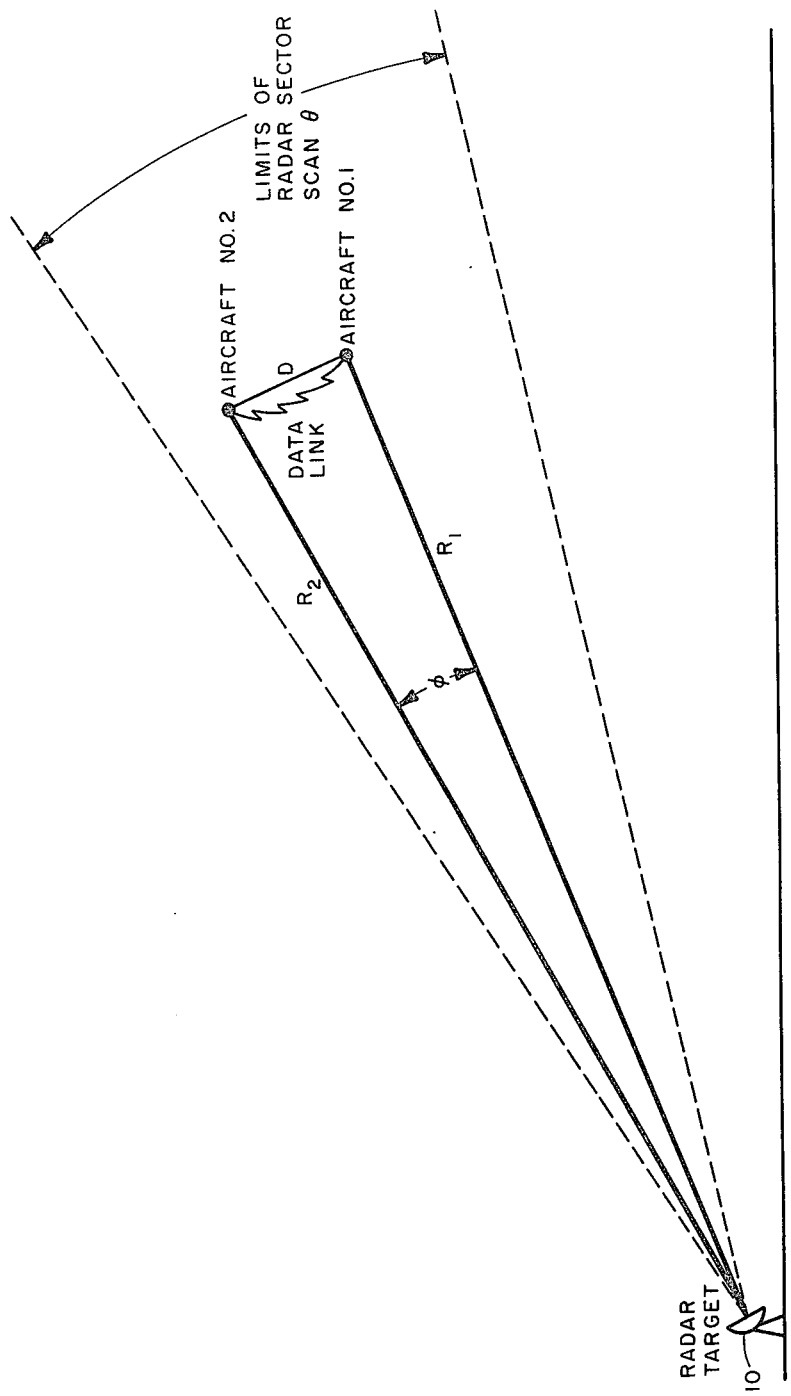
FIG. 1 is a diagram showing the geometry involved in the passive range measurement.

Referring now to the drawing, there is shown in FIG. 1 a radar target 10 operating as a nodding-type height finder. Aircraft No. 1 and aircraft No. 2 are flying an over-under pattern and are positioned relative to each other so that the line of sight between them is approximately perpendicular to the direction of the radar-beam scans of radar target 10.

Referring to FIG. 1 it is seen that if the angle between D and $R_1$ is a right angle, then $$R_1 = D/\tan \Phi$$
$$R_2 = D/\tan \Phi$$

For small values of $\Phi$ $$R_2 \approx R_1 \approx D/\Phi$$

The approximate value of both $R_1$ and $R_2$ then is $$R = D/\Phi \qquad 1.$$

where $\Phi$ is expressed in radians. The time required for the center of the beam of radar 10 to scan from aircraft No. 1 to aircraft No. 2 is directly proportional to the angle $\Phi$ and can be represented by:

$$\Delta t = \Phi/\omega \qquad 2.$$

where $\Delta t$ is measured in seconds and $\omega$ is measured in radians per second. Combining equations (1) and (2):

$$R = D/(\omega \Delta t)$$

$\omega$ will be a constant for any given type of radar target.

Figure 2:
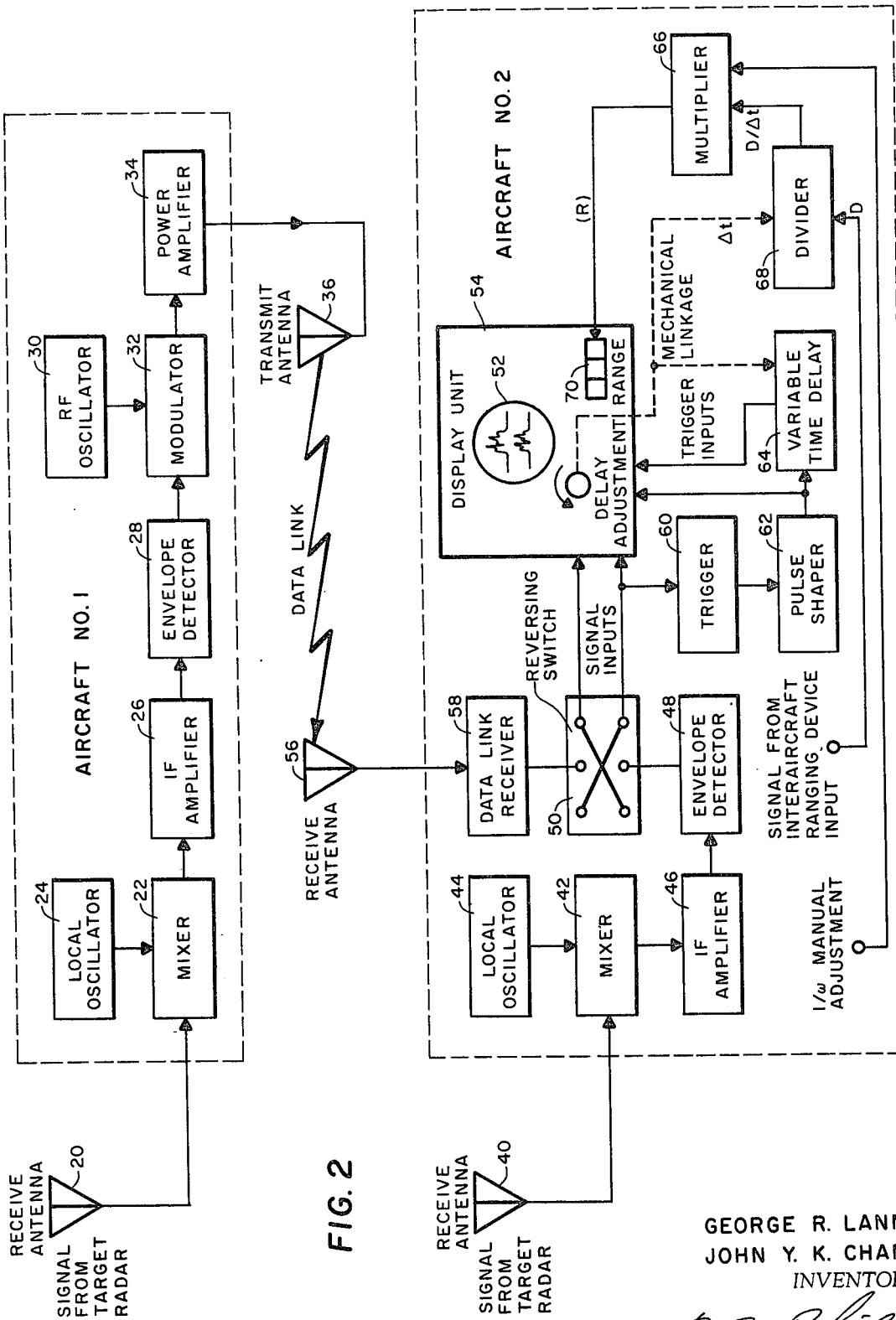
FIG. 2 is a block diagram of the invention.

Referring now to FIG. 2, there is shown for aircraft No. 1 a receiving antenna 20 for receiving signals from the radar target 10. The signal received at antenna 20 is fed to mixer 22 where it is heterodyned with the signal from local oscillator 24. The intermediate frequency out of mixer 22 is fed through IF amplifier 26 to envelope detector 28. The signal out of envelope detector 28 is used to modulate a radio frequency carrier signal supplied by RF oscillator 30 in modulator 32. The modulated signal is amplified in power amplifier 34 and transmitted by transmitting antenna 36. The carrier frequency generated by oscillator 30 should be well removed from the target radar frequency.

Aircraft No. 2 has a receiving antenna 40 for receiving signals from the radar target 10. In the same manner as in aircraft No. 1, the signal received at antenna 40 is fed to mixer 42 where it is heterodyned with the signal from local oscillator 44. The intermediate frequency signal out of mixer 42 is amplified in IF amplifier 46 and fed to envelope detector 48. The output signal from envelope detector 48 is fed through reversing switch 50 as a first input to a dual-trace display scope 52 of a display unit 54. The signal transmitted by antenna 36 in aircraft No. 1 is received by antenna 56 in aircraft No. 2 where it is fed through a data-link receiver 58 to recover the envelope of the signal received by antenna 20 of aircraft No. 1. The signal out of data-link receiver 58 is fed through reversing switch 50 as a second input to dual-trace display scope 52. Reversing switch 50 is to provide the interchanging of the two signal inputs to scope 52. At a point beyond reversing switch 50 one of the signals is tapped off and fed to trigger circuit 60. The output pulse from trigger circuit 60 is shaped by pulse shaper 62 and fed to scope 52 and variable time delay 64. The output of variable time delay 64 is fed to scope 52 to trigger the other scope trace.

The $1/\omega$, which is a constant for a particular type of target radar is manually fed as an input to multiplier 66. $D/\Delta t$ is provided by feeding a signal from the interaircraft ranging device to divider 68 where it is modified by manually adjusting divider 68 to provide an output signal proportional to $D/\Delta t$. The output signal from multiplier 66 is proportional to R and is registered on the range indicator 70 of display unit 54.

In operation, aircraft No. 1 receives the radar signals, performs a pulse-amplitude envelope detection, and re-transmits this information to aircraft No. 2 over a data link at a carrier frequency considerably different from the target frequency. At aircraft No. 2, this pulse-amplitude envelope from aircraft No. 1 is again detected and presented on one trace of a dual-trace display scope 52. Aircraft No. 2 also receives the target radar signal directly and presents the detected pulse-amplitude envelope on the other trace of the display scope 52. One of the pulse-amplitude envelope signals is fed to a trigger-pulse-generating circuit which consists of a threshold triggering circuit 60 followed by a pulse shaper 62 and a variable time delay 64. Sweeping past the antenna of aircraft No. 1, the target radar beams lobe structure pattern will increase to a level which causes trigger circuit 60 to emit a pulse. This pulse is applied to one of the scope trace triggers (for example, the lower trace) and at the same time is fed to variable time delay 64. The output of time delay 64 is used to trigger the other (upper) scope trace. If the direction of the target radar beam's sweep is such that it illuminates the antenna of aircraft No. 1 before that of aircraft No. 2, an appropriate setting of variable time delay 64 will cause the two lobe patterns to line up on display scope 52. If the antenna of aircraft No. 2 is illuminated by the target radar first, the two signal inputs must be interchanged by means of reversing switch 50 before the patterns can be matched.

Obviously many modifications and variations of the present invention are possible in the light of the above teachings. It is therefore to be understood that within the scope of the appended claims the invention may be practiced otherwise than as specifically described.

What is claimed is:

1. In a passive airborne ranging system for determining the range of target radars located on the surface of the earth, the combination comprising:
   a. first and second aircraft flying in a predetermined formation, each having radar receivers mounted therein for receiving energy signals radiated by a target radar of interest,
   b. said first aircraft having an envelope detector circuit means coupled to its radar receiver for detecting the envelope of the received radar signal,
   c. said first aircraft having a data link transmitter coupled to said first aircraft envelope detector for transmitting a signal modulated by the detected radar signal received by said first aircraft,
   d. said second aircraft having an envelope detector circuit means coupled to its radar receiver for detecting the envelope of the received radar signal,
   e. said second aircraft having data links receiving means for receiving and detecting the transmitted signal from said first aircraft,
   f. signal comparison means coupled to the envelope detector of said second aircraft and to said data link receiving means for producing an output signal proportional to the approximate range of the target radar to said second aircraft.

2. The ranging system of claim 1 wherein said signal comparison means includes visual means for determining the time delay between the time of arrival of the target radar signal at said first aircraft and the time of arrival of the target radar signal at said second aircraft.

3. The ranging system of claim 2 wherein the determined time delay is coupled as the only variable to a computing circuit to determine said range.

4. The ranging system of claim 2 wherein said signal comparison means includes:
   a. a divider circuit having a first input proportional to said time delay, a second input proportional to the distance between said aircraft and having an output,
   b. and a multiplier circuit having a first input coupled to the output of said divider circuit, a second input proportional to the angular scan rate of the target radar and producing an output signal proportional to the range of said aircraft to said target radar.

* * * * *